United States Patent [19]

Dunlap et al.

[11] Patent Number: 5,610,961
[45] Date of Patent: Mar. 11, 1997

[54] FUEL ASSEMBLY STRUCTURE USING CHANNEL FOR LOAD SUPPORT

[75] Inventors: Thomas G. Dunlap, Wilmington; Richard A. Proebstle, Wrightsville Beach; Robert B. Elkins; Christian D. Frederickson, both of Wilmington, all of N.C.

[73] Assignee: General Electric Company, Schenectady, N.Y.

[21] Appl. No.: 567,152

[22] Filed: Dec. 5, 1995

Related U.S. Application Data

[63] Continuation-in-part of Ser. No. 542,382, Oct. 12, 1995.

[51] Int. Cl.⁶ ........................................... G21C 3/322
[52] U.S. Cl. ........................................ 376/446; 376/444
[58] Field of Search .................................. 376/434, 444, 376/446, 448

[56] References Cited

U.S. PATENT DOCUMENTS

| | | |
|---|---|---|
| 3,015,616 | 1/1962 | Sturtz et al. . |
| 3,197,381 | 7/1965 | Blake . |
| 3,344,036 | 9/1967 | Haslam et al. . |
| 3,366,546 | 1/1968 | Anthony et al. . |
| 3,395,077 | 7/1968 | Tong et al. ............... 376/439 |
| 3,607,639 | 9/1971 | Van Santen et al. ............ 376/446 |
| 3,697,376 | 10/1972 | Mefford et al. . |
| 3,968,008 | 7/1976 | Piepers et al. ............... 376/446 |
| 3,992,259 | 11/1976 | Anthony et al. . |
| 4,038,137 | 7/1977 | Pugh . |
| 4,364,901 | 12/1982 | Feutrel . |
| 4,418,036 | 11/1983 | Gjertsen et al. . |
| 4,499,047 | 2/1985 | Borrman et al. . |
| 4,560,532 | 12/1985 | Barry et al. ............... 376/446 |
| 4,578,241 | 3/1986 | Borrman et al. . |
| 4,587,093 | 5/1986 | Borrman et al. . |
| 4,588,550 | 5/1986 | Blomstrand et al. . |
| 4,632,804 | 12/1986 | Wallander et al. . |
| 4,652,426 | 3/1987 | Boyle et al. . |
| 4,666,664 | 5/1987 | Doshi . |
| 4,683,117 | 7/1987 | Carlson et al. . |
| 4,749,547 | 6/1988 | Blomstrand et al. . |
| 4,795,608 | 1/1989 | Nylund . |
| 4,895,697 | 1/1990 | Andersson et al. . |
| 5,255,300 | 10/1993 | Patterson et al. ............... 376/444 |
| 5,327,471 | 7/1994 | Meier et al. . |
| 5,339,342 | 8/1994 | Meier et al. ............... 376/446 |

FOREIGN PATENT DOCUMENTS

| | | |
|---|---|---|
| 0099323 | 1/1984 | European Pat. Off. . |
| 353317A1 | 3/1987 | Germany . |

*Primary Examiner*—Daniel D. Wasil
*Attorney, Agent, or Firm*—Nixon & Vanderhye P.C.

[57] ABSTRACT

A fuel assembly for a nuclear reactor vessel includes a plurality of fuel rods, at least one coolant rod, a lower tie plate supporting the fuel rods and coolant rod, and a channel surrounding the fuel rods, coolant rod and tie plate. The lower tie plate is supported by the channel such that the channel carries a load of the fuel assembly. In one aspect of the invention, a conventional upper tie plate is removed and a handle assembly is provided that includes two spring loaded latch pins engageable with corresponding apertures in the channel. A transition member supports the lower tie plate and is rigidly secured to the channel. Thus, when lifting the fuel assembly from the reactor, the channel bears the load of the fuel assembly. If it is desired to remove the fuel bundle from the channel, the handle assembly is released from the assembly by releasing the latch pins. The bundle can then be removed from the channel by attaching a grapple head to the coolant rod ends, which are specially shaped to facilitate an attachment tool.

10 Claims, 8 Drawing Sheets

FUEL ASSEMBLY STRUCTURE USING CHANNEL FOR LOAD SUPPORT

This application is a Continuation-In-Part of U.S. patent application Ser. No. 08/542,382 (Attorney Docket No. 1585-104), filed Oct. 12, 1995.

TECHNICAL FIELD

This invention relates to the structure of a fuel assembly in a boiling water nuclear reactor vessel and, more particularly, to a fuel assembly structure that selectively utilizes the channel to support its load, thereby eliminating the need for fuel tie rods.

BACKGROUND

A conventional fuel assembly in a boiling water nuclear reactor vessel includes a lower tie plate, an upper tie plate and a matrix of the sealed fuel rods supported between the upper and lower tie plates. The fuel rods contain nuclear fuel pellets in sealed containment for supporting a required critical reaction for the generation of steam. One or more coolant rods is included in the matrix of the fuel rods and is also supported between the upper and lower tie plates. A channel surrounds the tie plates, fuel rods and coolant rod. This channel is commonly square in cross-section and made of metal (preferably an alloy called Zircaloy). Water passes from the bottom of the fuel assembly to the top of the fuel assembly. Water enters through the lower tie plate within the channel and passes between the upstanding fuel rods. Water and generated steam exit from within the channel between the fuel rods and out through the upper tie plate. The channel confines the required moderator coolant flow to a flow path that is restricted between the tie plates.

The lower tie plate and the upper tie plate serve to support the sealed fuel rods in the vertical and upstanding matrix. Typically, the upper tie plate forms an overlying matrix of fuel rod support points. Into about eight of these support points are conventionally placed correspondingly male threaded tie rods and fittings. The tie rods, which contain fuel similar to the fuel rods, are threaded at their lower ends for corresponding attachment to the lower tie plate. The lower tie plate similarly forms an underlying matrix of fuel rod support points. These underlying support points correspond for the most part to the overlying support points of the upper tie plate. Conventionally, about eight of these support points are threaded with female apertures, which correspond to the overlying apertures in the upper tie plates. Into these threaded support points in the lower tie plates are placed the lower threaded ends of the fuel tie rods. Thus, conventionally, the two tie plates are tied together with the fuel tie rods.

The tie plates also define a matrix of apertures for permitting fluid flow into and out of the fuel assembly. Specifically, the lower tie plate defines a first matrix of apertures for permitting the in flow of water coolant. This coolant functions in the capacity of moderating or slowing down reaction produced fast neutrons to produce reaction continuing slow or thermal neutrons. At the same time, as the coolant passes upwardly through the fuel assembly within the channel, a portion of the coolant is turned to steam. This steam and the coolant that is not turned into steam and remains in the liquid phase must pass out through the upper tie plate. Consequently, the upper tie plate forms its own matrix of apertures in between its matrix of fuel rod support points. The upper tie plate matrix of apertures permits the out flow of the two phase steam/water mixture from the fuel assembly.

The fuel bundle must be periodically replaced and/or inspected during so-called "outages" of a reactor. These outages occur when the central steam generating core of a nuclear reactor has its overlying component removed to provide access through shielding water to the core. During such "outages," sections of the reactor vessel core are removed, inspected and/or replaced. The core, submerged in a radiation quenching bath of water, has the fuel bundles to be replaced for inspection removed by remotely grasping the fuel assembly at a handle. The handle must define, at the top of the fuel assembly, a support point for the entire weight of the fuel assembly in a depending relationship when the assembly is removed from the vessel. Once the fuel assembly is supported at the handle, the entire weight of the fuel assembly is carried through the handle. This weight includes the weight of the fuel and coolant rods, the weight of the upper tie plate, the weight of the lower tie plate and the weight of the surrounding channel (upwards of 600 pounds).

Once the fuel assembly is removed from the vessel, the tie plates, fuel rods and coolant rods can be separated from the channel. After separation from the channel, the fuel rods can easily be inspected and/or replaced. Conventionally, however, the threaded end plugs of the fuel tie rods tend to seize in their threaded connections, thus making replacement of the fuel tie rods difficult and time consuming. Moreover, as fuel assembly design lifetimes are extended, corrosion effects weaken the fuel tie rods. This weakening occurs due to corrosion thinning of the material and by a reduction in ductility due to the formation of hydrogen and its absorption.

Thus, there is a need to provide a fuel assembly structure that does not include fuel tie rods threadedly connected between the upper and lower tie plates. Moreover, there is a need to utilize a structural load path for the fuel assembly that is less affected by corrosion effects. In general, since corrosion is a surface phenomena, a structure with a high volume to surface area provides more margin in this regard. Without adding additional structure to the general design of boiling water reactor fuel assemblies, the component with the highest volume to surface area is the channel.

In designing a nuclear fuel assembly, one of the limiting constraints for very high exposure capabilities is the pressure built up in the fuel rods due to fission gas release. Also, the differential irradiation growth of the fuel rods and water rods becomes more significant at high exposures, requiring very long end plug extensions which are guided laterally by bosses in current upper tie plate designs. These long end plug extensions reduce the length available for the fuel rod plenum used to accommodate the fission gas release. The upper tie plate and upper end plug designs currently used require complex machining, and these components, as well as the expansion springs, are costly.

DISCLOSURE OF THE INVENTION

It is therefore an object of the invention to eliminate the upper tie plate grid structure, which currently guides the upper ends of the fuel rods laterally, in favor of only a handle bar assembly. The handle bar assembly engages the water rods and is selectively engageable with the channel. By eliminating the upper tie plate grid, the fuel rods may be extended in length to a point that adequate clearance with the upper handle of the fuel assembly and the fuel handling equipment is maintained. The upper end plugs may also be shortened to thereby allow for the further extension of the fuel rod plenum length. Elimination of the upper tie plate with its complex grid construction also reduces the flow restriction and pressure drop at the top of the bundle, and provides an opportunity to reduce the overall cost of fuel assembly fabrication. An additional benefit is that some of the fuel rods can be removed from the bundle without having to remove any other structural members from the upper end of the bundle.

Because the upper tie plate grid is eliminated, the other nonstructural fuel and water rods are free at their upper ends. If considered necessary or desirable, the uppermost (or an additional) spacer may be located near the upper ends of the rods to provide lateral support. Very short upper end plugs may now be used, since they function only to seal the upper ends of the fuel rods, and thus, the plenum regions of the fuel rods may be extended.

It is another object of the invention to provide a method of removing the fuel bundle from the fuel assembly.

These and other objects of the invention are achieved by providing a latch pin assembly for a handle assembly in a boiling water nuclear reactor including a fuel assembly channel surrounding a plurality of fuel rods and at least one coolant rod. The latch pin assembly includes a latch pin selectively engageable with the fuel assembly channel; and an anchoring assembly cooperating with the latch pin, wherein the anchoring assembly anchors the latch pin in a selected position such that the latch pin selectively engages the fuel assembly channel.

The handle assembly may include a latch pin channel, wherein the latch pin is configured to be movably disposed in the latch pin channel. The latch pin may include an inner shaft configured to be movably disposed in the latch pin channel and an outer shaft surrounding the inner shaft and configured to be movably disposed in the latch pin channel, wherein the inner shaft is movable relative to the outer shaft.

The anchoring assembly may include at least one annular groove formed in the latch pin channel; an aperture formed in the outer shaft; and an anchoring member disposed in the aperture and engageable with the at least one annular groove and the inner shaft. The anchoring member is preferably a ball, and the anchoring assembly preferably includes two annular grooves formed in the latch pin channel, one of the two annular grooves corresponding to a first latch pin position where the latch pin is engaged with the fuel assembly channel, and the other of the two annular grooves corresponding to a second latch pin position where the latch pin is disengaged from the fuel assembly channel.

The inner shaft may include a transition shaft portion and an inner shaft head, wherein the inner shaft head has a first diameter section, a tapering diameter section and a second diameter section, smaller than the first diameter section. In this regard, the anchoring member engages the inner shaft at the tapering diameter section of the inner shaft head. The latch pin may further be provided with a locking ring secured to an inside end of the outer shaft and defining a shelf inside the outer shaft, and the latch pin assembly may further include a spring disposed between the shelf and the first diameter section of the inner shaft head, wherein the spring urges the latch pin toward a position in engagement with the fuel assembly channel.

In accordance with another aspect of the invention, there is provided a fuel assembly including a plurality of fuel rods; at least one coolant rod; a fuel assembly channel surrounding the plurality of fuel rods and the coolant rod; a handle assembly disposed inside the fuel assembly channel and receiving the at least one coolant rod; and a latch pin assembly selectively engageable with the fuel assembly channel.

The latch pin assembly may include a latch pin, and the latch pin assembly may further comprise an anchoring assembly cooperating with the latch pin, wherein the anchoring assembly anchors the latch pin in a selected position such that the latch pin is selectively engageable with the fuel assembly channel. In addition, the handle assembly may include a latch pin channel, wherein the latch pin is movably disposed in the latch pin channel.

In accordance with still another aspect of the invention, there is provided a fuel assembly for a nuclear reactor vessel that includes a plurality of fuel rods; at least one coolant rod; a channel surrounding the plurality of fuel rods and the at least one coolant rod; and a lower tie plate supporting the plurality of fuel rods and the at least one coolant rod, wherein the lower tie plate is supported by the channel such that the channel carries a load of the fuel assembly.

The fuel assembly may further be provided with a handle assembly disposed inside the channel that receives the at least one coolant rod; and connecting structure releasably connecting the handle assembly and the channel. In this regard, the connecting structure may include at least one extendible and retractable latch pin, wherein the channel includes a corresponding at least one aperture for receiving the latch pin. The connecting structure may include two opposed extendible and retractable latch pins, wherein the channel includes a corresponding two opposed apertures for receiving the latch pins. The handle assembly may include two boss members each having a channel therein, wherein each of the latch pins is movably disposed in the each of the channels, respectively. The boss members may be integral with the handle assembly.

The latch pin may include an inner shaft configured to be movably disposed in the latch pin channel and an outer shaft surrounding the inner shaft and configured to be movably disposed in the latch pin channel, wherein the inner shaft is movable relative to the outer shaft. In this regard, the anchoring assembly may include at least one annular groove formed in the latch pin channel; an aperture formed in the outer shaft; and an anchoring member disposed in the aperture and engageable with the at least one annular groove and the inner shaft. The anchoring member is preferably a ball, and the anchoring assembly preferably includes one annular groove formed in the latch pin channel at a location which, when the ball is engaged therein, corresponds to a first latch pin position where the latch pin is engaged with the fuel assembly channel.

The inner shaft may be provided with a transition shaft portion and an inner shaft head, wherein the inner shaft head comprises a first diameter section, a tapering diameter section and a second diameter section, smaller than the first diameter section. In this regard, the anchoring member engages the inner shaft at the tapering diameter (or a flat) section of the inner shaft head. Finally, the latch pin may further include a locking ring secured to an inside end of the outer shaft that defines a shelf inside the outer shaft, wherein the latch pin assembly further includes a spring disposed between the shelf and the first diameter section of the inner shaft head. The spring urges the anchoring members toward a radially outward position by moving the inner shaft so that its first diameter portion positions the anchoring members at the desired location within the groove.

BRIEF DESCRIPTION OF THE DRAWINGS

These and other aspects and advantages of the present invention will become apparent from the following detailed description of preferred embodiments when taken in conjunction with the accompanying drawings, in which.

BEST MODE FOR CARRYING OUT THE INVENTION

Figure 1:
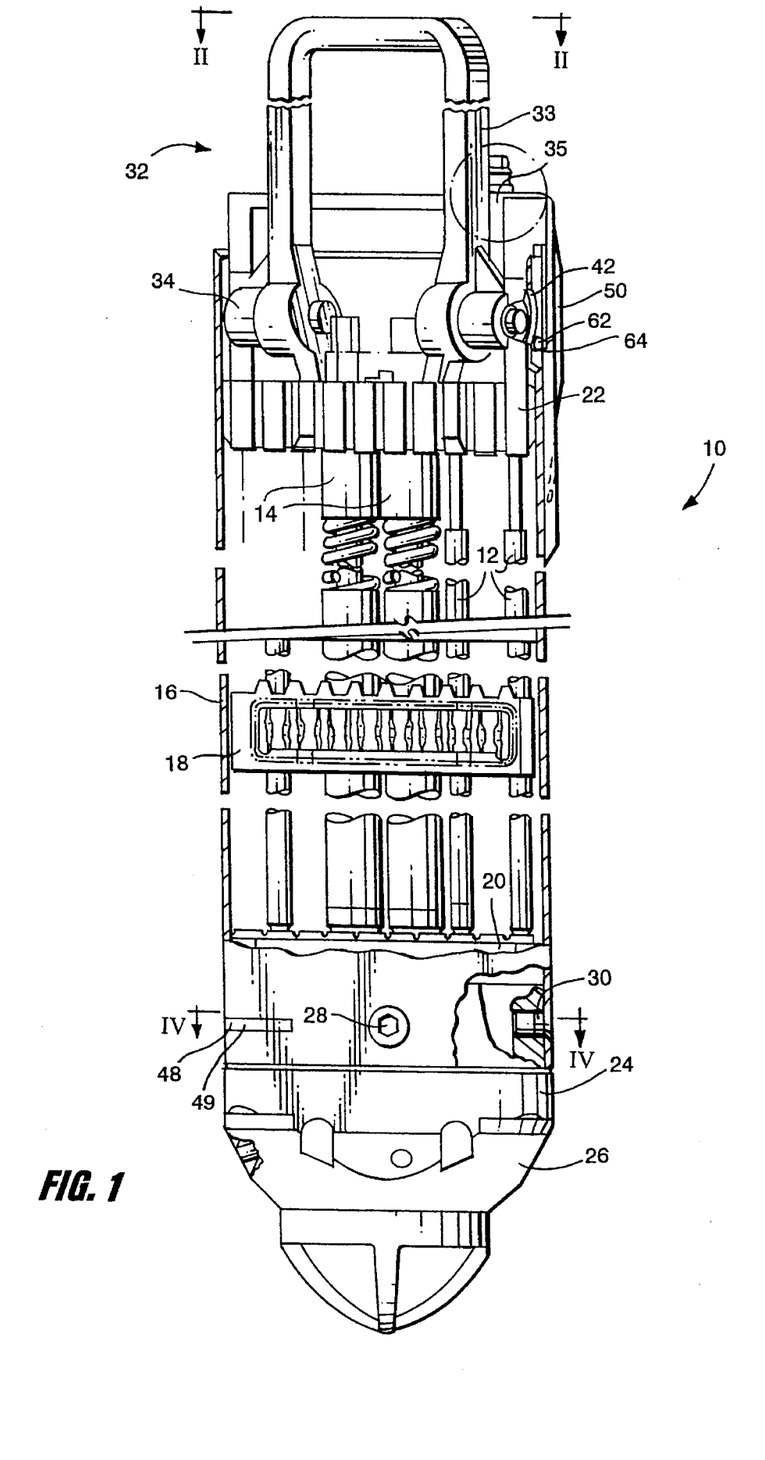
FIG. 1 is a cross-sectional view of a fuel assembly according to the invention.

FIG. 1 is a cross-section of a fuel assembly for a boiling water nuclear reactor in accordance with one embodiment of the present invention. The fuel assembly 10 includes a plurality of fuel rods 12, a pair of coolant rods 14 (two coolant rods 14 are illustrated and described in the preferred embodiment, however, a single coolant rod is often used in such fuel assemblies), and a channel 16 surrounding the fuel rods 12 and coolant rods 14. The fuel rods 12 are preferably arranged in a 10×10 matrix and are secured against lateral movement in the channel by a plurality of spacers 18. The coolant rods 14 are generally centrally disposed in the fuel rod matrix. Small holes are provided at both the lower and upper ends of the coolant rods 14 allowing water to be driven through the rod, thus introducing moderating material within the fuel rod matrix. One water rod also serves as the spacer-capture rod being mechanically locked to each of the spacers 18, thereby fixing the axial position of each spacer 18. The fuel rod spacers 18 are equipped with Inconel-X springs to maintain rod to rod spacing.

The fuel rods 12 and the coolant rods 14 are supported by a lower tie plate 20. In this embodiment, upper tie plate 22 receives the fuel rods 12 and the coolant rods 14 and restricts lateral movement. End plugs of the fuel rods have pins that fit into anchor holes in the tie plates 20, 22. An expansion space located over the top end plug of each fuel rod allows them to expand axially by sliding within the holes in the upper tie plate to accommodate differential axial thermal expansion. In contrast with the conventional structure, none of the fuel rods is threaded into the lower tie plate 20 or the upper tie plate 22. One or both of the coolant rods 14 may be securely threaded into the lower tie plate 20. As discussed above in connection with the prior art, it is not desirable to thread anything into the tie plates 20, 22 as the threads tend to seize over extended submersion times. In contrast with the fuel rods 12, however, the coolant rods 14 need not be removed from the bundle nearly as frequently as the fuel rods 12. Thus, in the present invention, the coolant rods 14 are threaded or otherwise securely attached to one or both of the tie plates 20, 22.

A transition member 24 supports the lower tie plate 20 in the channel 16 and serves as a transition to the nose piece 26. The channel 16 is secured to the transition member 24 by any suitable structure. In the illustrated embodiment, a bolt 28 is threaded through the channel and into the transition member 24. Four bolts 28 are preferably threaded one each through each side of the substantially square cross-section of the channel 16. The transition member 24 has corresponding threaded bolt receiving holes 30 in each side of its corresponding square cross-section. The bolts 28 are preferably formed of alloy X-750.

Integral with the upper tie plate 22 is a bail handle assembly 32.

Figure 2:
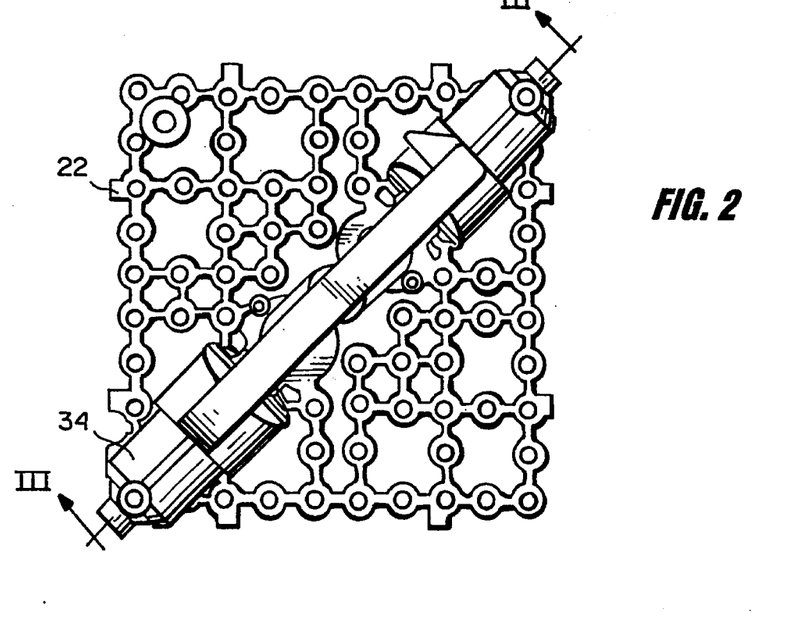
FIG. 2 is a view along line II—II in FIG. 1.
Figure 3:
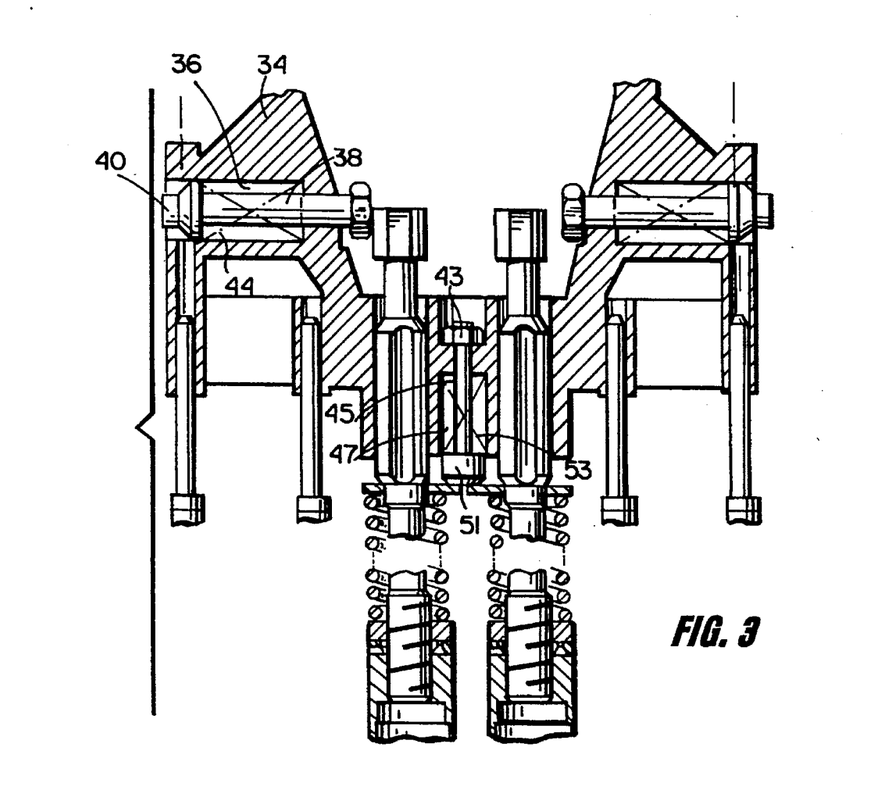
FIG. 3 is a cross-sectional view through line III—III in FIG. 2.

Referring to FIGS. 1 and 2, the bail handle assembly 32 includes a bail handle 33 and two boss members 34. FIG. 3 is a cross-section through line III—III in FIG. 2. The boss members 34 include a channel 36 formed therein. A latch pin 38 is movably disposed in the channel 36. A latch pin cap 40 is fixed to an outer end of the latch pin 38 and has a first outermost diameter that is configured to be extendible through a latch pin aperture 42 in the channel 16 and a second innermost diameter that is larger than the latch pin aperture 42 in the channel 16 and that serves as a stop surface for the latch pin 38. An inside surface of the latch pin cap 40 delimits the channel 36 in the boss members 34. A spring 44 is disposed around the latch pin 38 in the channel 36 between the inside surface of the latch pin cap 40 and an end of the channel 36. The spring 44 urges the latch pin 38 to an extended position, engaging the latch pin aperture 42 in the channel 16.

In operation, because the transition member 24 is rigidly secured to the channel 16 by means of the bolt 28 and because the latch pin 38 is inserted into the latch pin aperture 42 in the channel 16, when lifting the fuel assembly 10 with the bail handle assembly 32, the channel 16 bears the structural load of the fuel assembly 10. As noted above, the channel 16 has the highest volume to surface area of the components in the fuel assembly 10 and better avoids the effects of corrosion.

With continued reference to FIG. 3, a bolt 43 is disposed between the water rods 14 in an aperture 45 in the upper tie plate 22. The bolt 43 extends into a channel 47. A substantially cylindrical member 51 is fixed to the end of the bolt 43 and delimits the channel 47. A spring 53 is disposed surrounding the bolt 43 in the space delimited by the cylindrical member 51 and the top of the channel 47. The spring 53 serves to maintain the upper tie plate 22 spaced from the water rod main spring supports 55 as illustrated in FIG. 3. Moreover, the spring 53 urges the upper tie plate 22 upward such that the latch pins engage an upper end of the latch pin apertures 42. Still further, preload forces of the water rod main springs are diverted from the upper tie plate 22.

Figure 4:
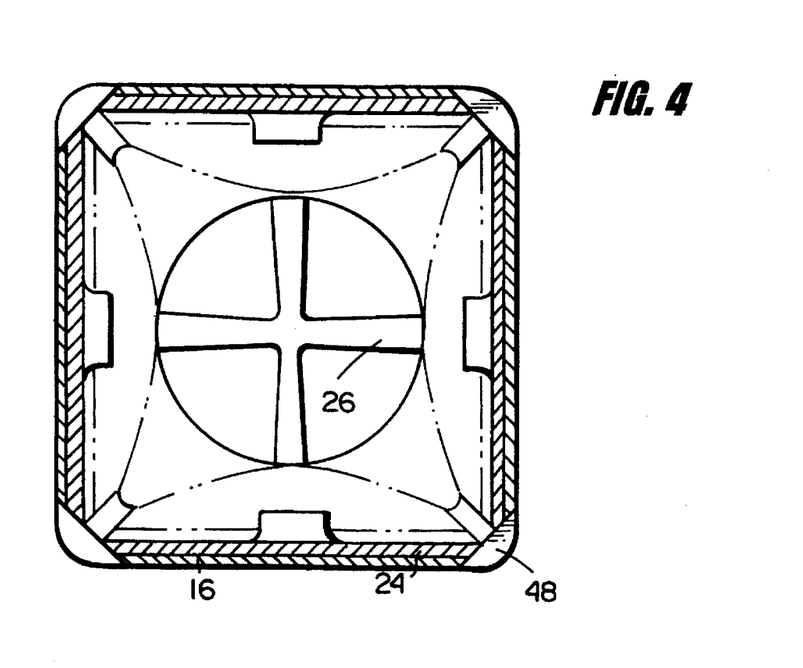
FIG. 4 is a bottom view of the fuel assembly according to the invention.

FIG. 4 is a cross sectional view through line IV—IV in FIG. 1. Through the channel 16 adjacent the transition member 24 are provided a plurality of end gussets or clips 48 that are attached to the channel 16 and that are inserted into corresponding slots 49 in the transition member 24. The clips 48 serve as a backup support for the assembly in the event that the bolts 28 fail. In a preferred embodiment, four end clips 48 are provided, one each attached to each corner of the channel 16. The end clips 48 are preferably welded to the channel.

Figure 5:
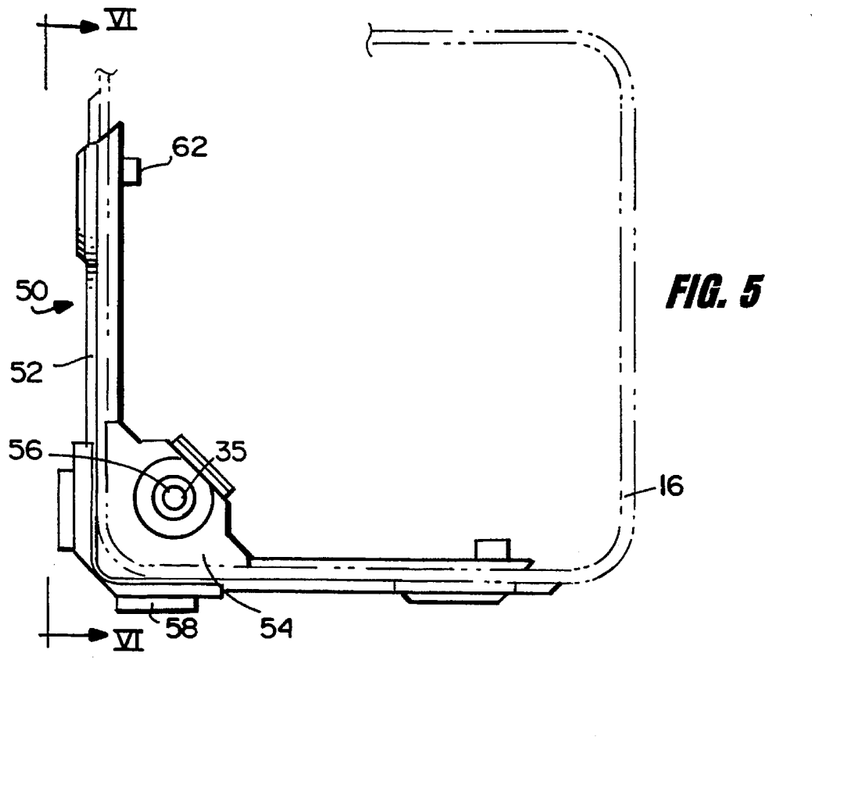
FIG. 5 is a plan view of the channel guide according to the invention.
Figure 7:
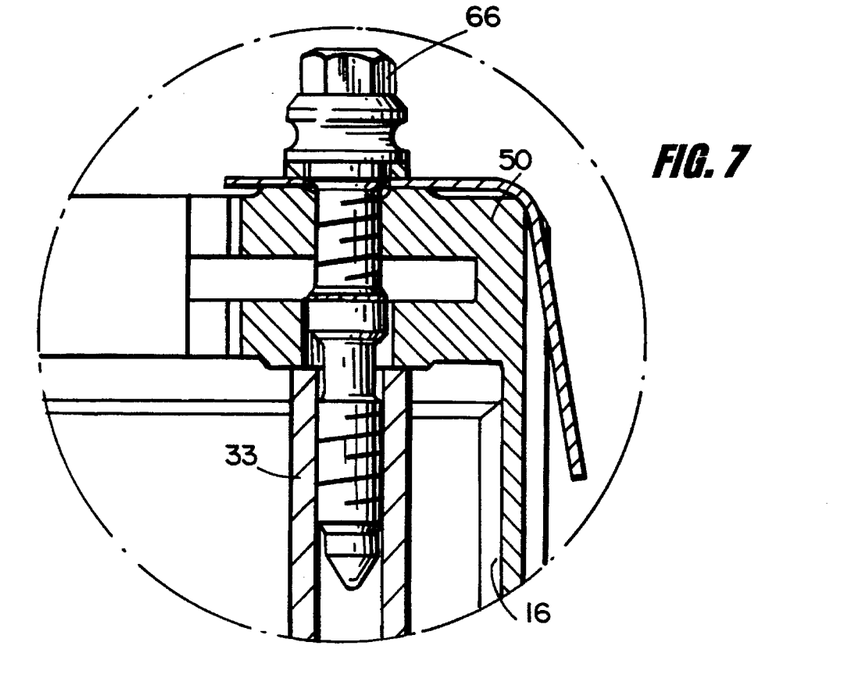
FIG. 7 illustrates the connecting structure for connecting the channel guide to the upper tie plate.

FIG. 5 illustrates a channel guide 50 according to the present invention. The channel guide 50 includes two channel guide arms 52 disposed substantially at 90°. A center plate 54 is disposed substantially between the arms 52. The center plate 54 consists of a gusset having a threaded aperture 56 therein. The channel guide 50 is configured to surround the channel 16 and is mounted by the aperture 56 in the center plate 54 to a corner post 35 of the upper tie plate 22 with a bolt 66. The corner post 35 is integral with the upper tie plate 22. The bolt 66 securing the channel guide 50 to the corner post 35 of the upper tie plate 22 is illustrated in FIG. 7.

Figure 6:
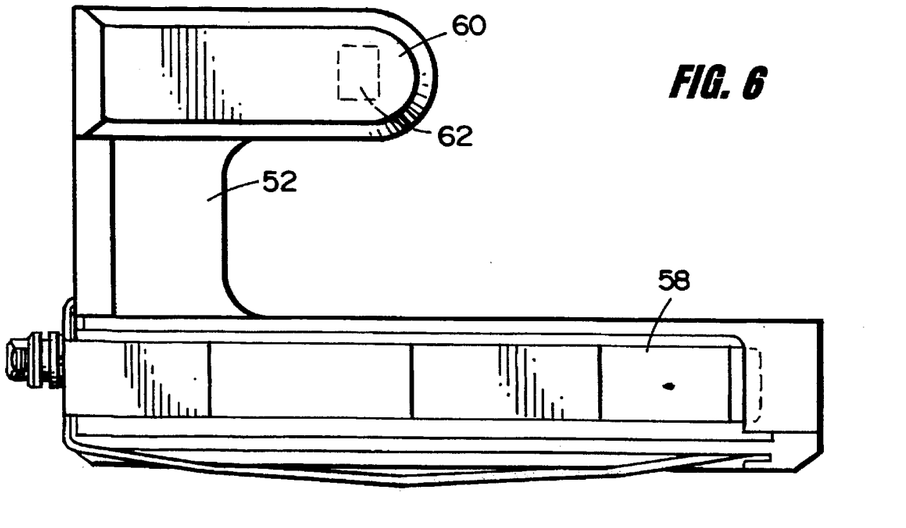
FIG. 6 is a side view of the channel guide along line VI—VI in FIG. 5.

Referring to FIG. 6, two spring leaves 58 are disposed in the vicinity of the center plate 54 and are adapted to support the channel guide 50 along the channel 16. At an end of each of the arms 52 is provided a leg 60 configured to extend in the same direction along the channel 16 as the spring leaves 58. An ear 62 protrudes from each leg 60 toward the channel 16. Referring to FIG. 1, the channel also includes ear apertures 64 configured to receive the ears 62. The ear apertures 64 are sized slightly larger than the ears 62 both in the longitudinal direction and the axial direction to enable the ears 62 to be freely inserted into and removed from the ear apertures 64 and to accommodate differential axial thermal expansion. The ears 62 and ear apertures 64 thus provide a redundant support between the upper tie plate 22 and the channel 16 in the event that the spring loaded latch pins 38 fail.

If it is desired to remove the upper tie plate from the assembly, the bolt 66 is removed from the corner post 35 of the upper tie plate 22, and the channel guide 50 is removed. The latch pins 38 are then compressed against the force of springs 44, either manually or using a tool, and the tie plate is lifted from the assembly using the bail handle 33. The fuel bundle can then be removed from the channel 16 by attaching a known grapple head to the coolant rod ends, which are specially shaped to facilitate an attachment tool.

Figure 8:
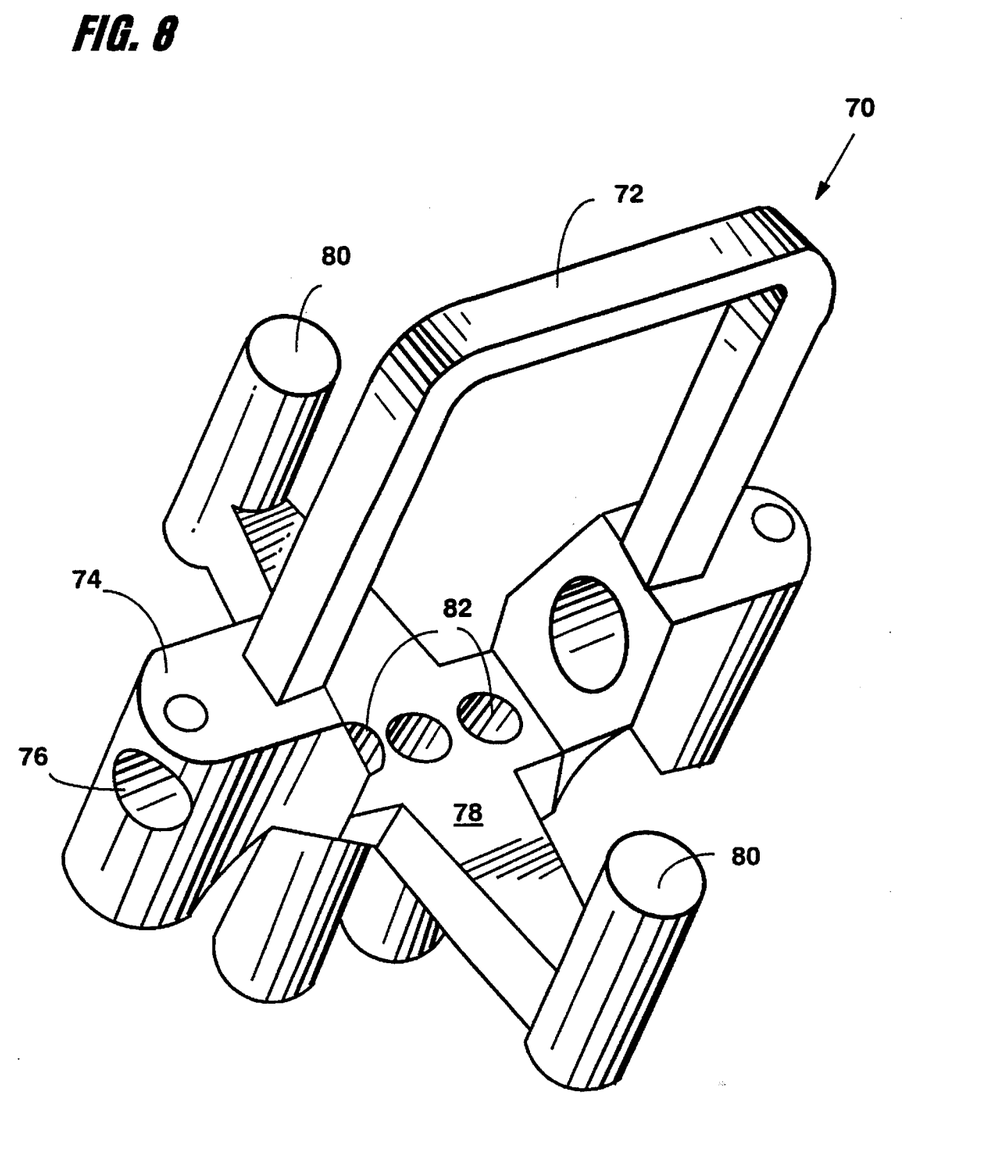
FIG. 8 is a perspective view of a handle assembly according to another embodiment of the invention.
Figure 9:
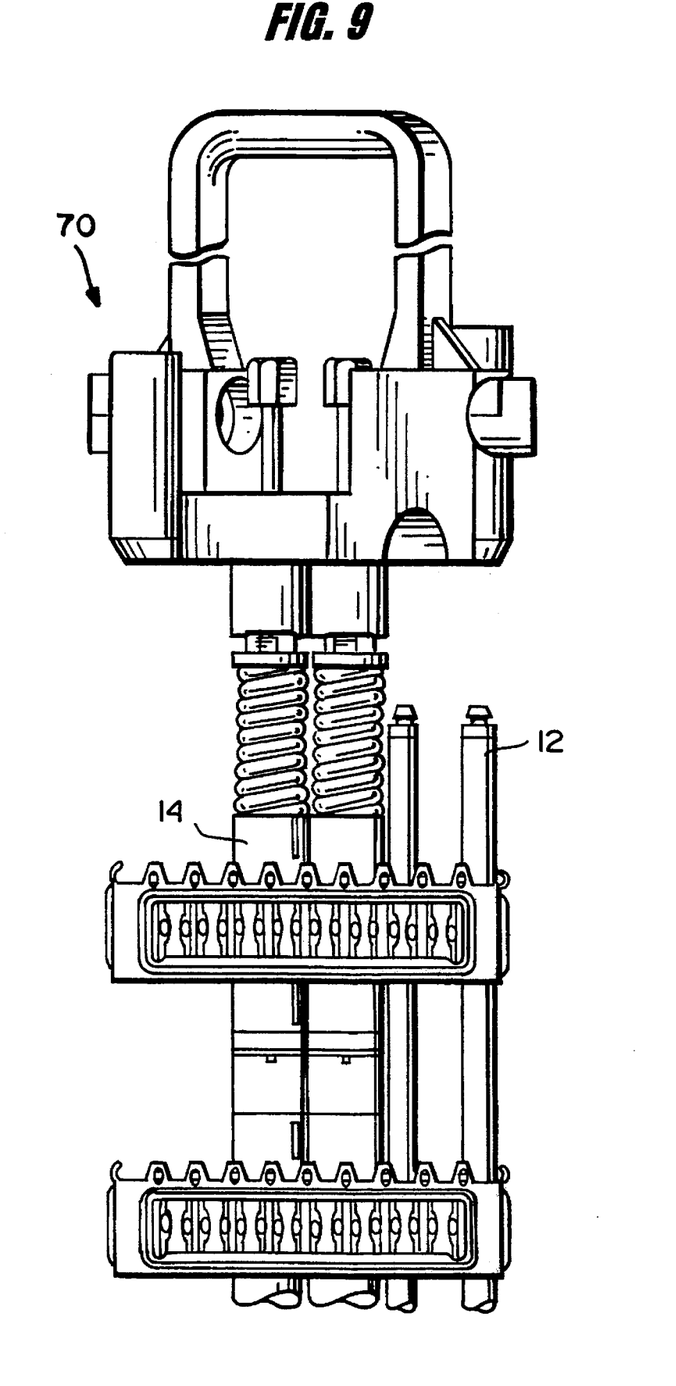
FIG. 9 is a front view of the top portion of the fuel assembly without the channel.
Figure 10:
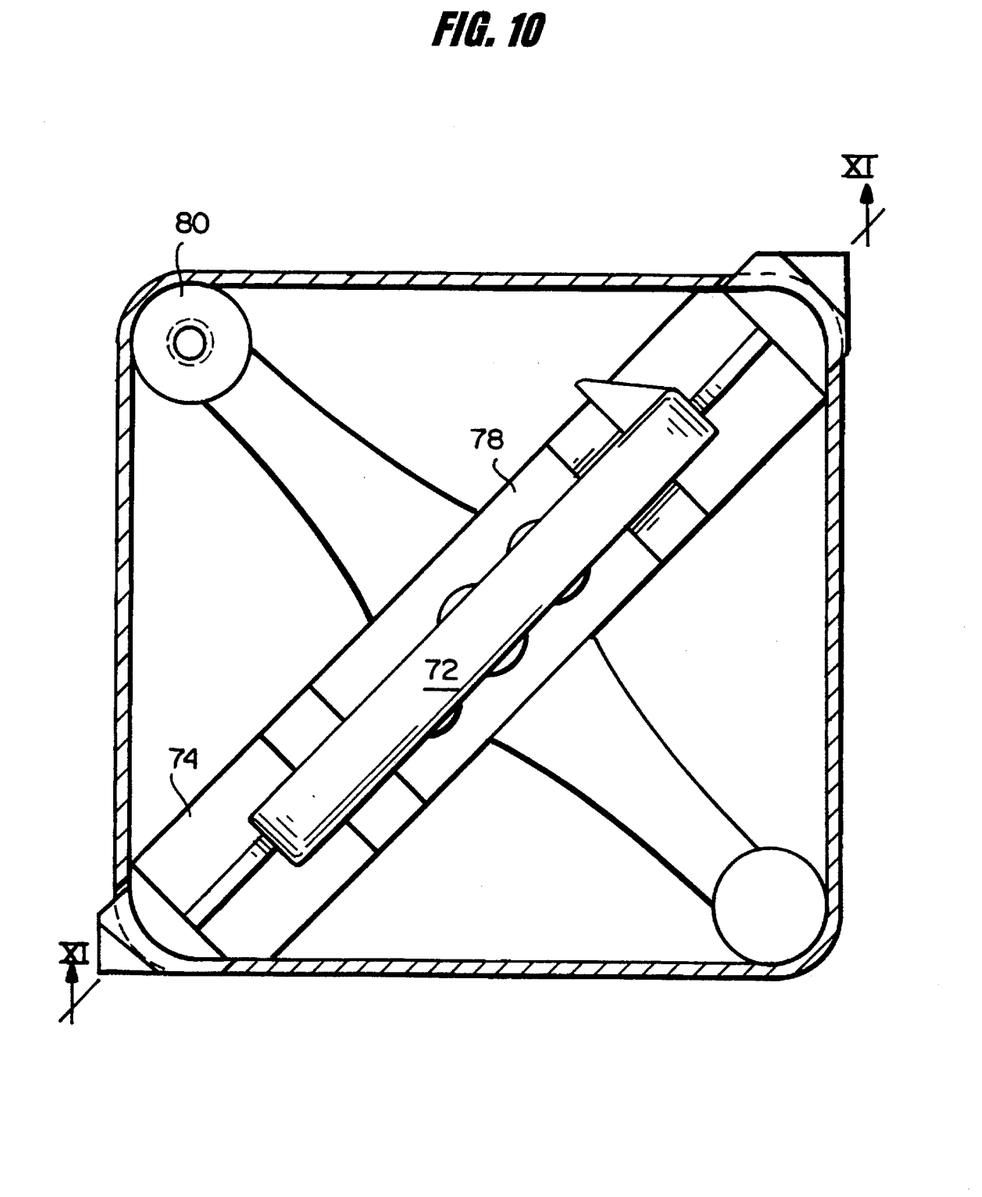
FIG. 10 is a top view of the fuel assembly.

In accordance with another embodiment of the invention, referring to FIGS. 8–10, at the upper end of the fuel bundle assembly 10, the conventional upper tie plate, which would normally receive the upper ends of the fuel rods 12, and rigidly connect to special fuel rods serving as tie rods (also rigidly connected to the lower tie plate) has been eliminated. In its place, there is provided a handle or lifting bar assembly 70. The handle bar assembly 70 is located above the upper free ends of the fuel rods 12 as shown in FIG. 9. The handle bar assembly 70 includes a bail handle 72 integral with a pair of boss members 74 having channels 76 therein. A cross member 78 having a pair of outriggers 80 is configured such that it is substantially perpendicular to the bail handle 72. As illustrated in FIG. 8, the central plane of the handle assembly 70 is disposed below the plane defined by the longitudinal axis of the channels 76. The coolant rods 14 extend upward through the holes 82 in the central plane.

Figure 11:
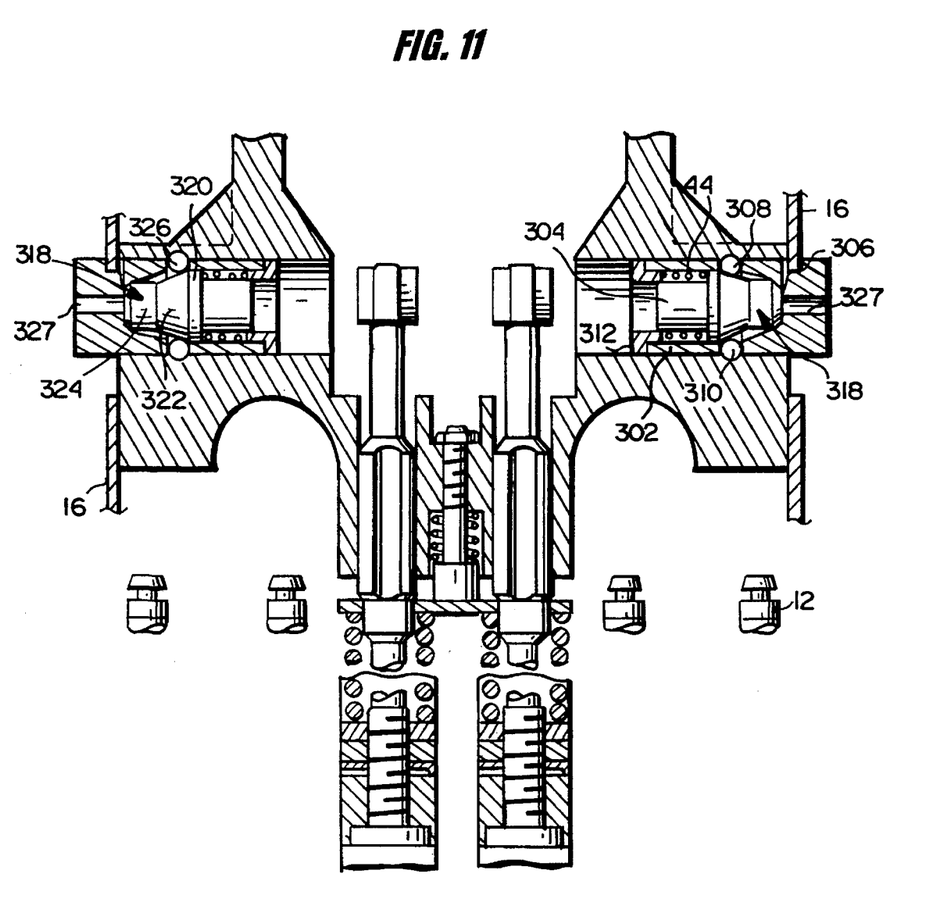
FIG. 11 is a cross-sectional view through line XI—XI in FIG. 10.

The channels 76 of the handle assembly 70 are each configured to accommodate a latch pin, such as the latch pin 38 described above, for selectively engaging the channel 16. FIG. 11 illustrates an alternative latch pin assembly 100 according to the invention. The remainder of the structure is the same as that described above, and like reference numbers correspond to like elements.

Referring to FIG. 11, each latch pin in this arrangement consists of an outer shaft 302 and an inner shaft 304. The outer shaft 302 is disposed in the channel 76 surrounding the inner shaft 304. A head portion of the outer shaft 302 includes a recessed area 306 that is adapted to receive the channel 16 of the fuel assembly. The outer shaft 302 includes a plurality of holes 308, at least three and preferably about five, evenly spaced about the periphery of the outer shaft 302. The holes 308 are configured to receive an anchoring member or ball 310. A locking ring 312 is secured to the innermost end of the outer shaft 302, preferably by threads, and provides a shelf for the spring 44.

The inner shaft 304 includes a transition shaft portion 316 and an inner shaft head 318. The inner shaft head 318 includes a first diameter section 320, a taper section 322 and a second diameter section 324 having a diameter smaller than the first diameter section 320. The taper section 322 is positioned relative to the outer shaft adjacent the holes 308 such that the balls 310 contact the taper section 322. The channel 76 includes an annular groove 326 that is shaped to receive the balls 310.

In the position illustrated in FIG. 11, the recessed portion 306 of the outer shaft 302 is extended through an aperture in the channel 16 such that the latch pin assembly connects the handle assembly 70 and the channel 16. The spring 44 urges the anchoring members or balls 310 toward a radially outward position by moving the inner shaft 304 so that the tapered section 322 and the first diameter section 320 position the balls 310 in the groove 326. As a result, the latch pin assembly 300 is positively secured in the channel engagement position.

To move the latch pin assembly so that it disengages from the channel, an external tool displaces the inner shaft 304 inwardly against the force of the springs 44 via access holes 327. As a result, the balls 310 are released from their positive engagement in the grooves 326 by virtue of the relative movement of the taper sections 322. The outer shafts 302 are then driven inwardly by the external tool and remain there by friction. In this configuration, the handle bar assembly 70 can be removed from the fuel assembly, allowing access to the water rods by a separate tool for removing the fuel bundle from the channel 16.

It should also be noted here that with the elimination of the upper tie plate, the conventional fuel rod end plugs can be made shorter in axial length, as shown in FIG. 9, and this allows the fuel rod itself to be extended, thus maximizing fuel rod plenum length.

Although the latch pin assembly that has been illustrated and described is preferred, those of ordinary skill in the art will contemplate alternative latch pin assemblies that function in an equivalent manner. Examples of such alternative latch pin assemblies are described in, for example, commonly owned co-pending U.S. application Ser. No. 08/551, 769 (Attorney Docket No. 1585-118), filed Nov. 7, 1995, the disclosure of which is hereby incorporated by reference. The invention is therefore not meant to be limited.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel assembly for a nuclear reactor vessel, the fuel assembly comprising:

a plurality of fuel rods;

at least one coolant rod;

a channel surrounding said plurality of fuel rods and said at least one coolant rod;

a lower tie plate supporting said plurality of fuel rods and said at least one coolant rod, said lower tie plate being supported by said channel such that said channel carries a primary load of said fuel assembly;

a handle assembly disposed inside said channel and receiving said at least one coolant rod; and connecting structure releasably connecting said handle assembly and said channel.

2. A fuel assembly according to claim 1, wherein said connecting structure comprises at least one extendible and retractable latch pin, said channel comprising a corresponding at least one aperture for receiving said latch pin.

3. A fuel assembly according to claim 2, wherein said connecting structure comprises two opposed extendible and retractable latch pins, said channel comprising a corresponding two opposed apertures for receiving said latch pins.

4. A fuel assembly according to claim 3, wherein said handle assembly comprises two boss members each having a channel therein, each of said latch pins being movably disposed in said each of said channels, respectively.

5. A fuel assembly according to claim 4, wherein said boss members are integral with said handle assembly.

6. A fuel assembly according to claim 2, wherein said latch pin comprises an inner shaft configured to be movably disposed in said latch pin channel and an outer shaft surrounding said inner shaft and configured to be movably disposed in said latch pin channel, said inner shaft being movable relative to said outer shaft.

7. A fuel assembly according to claim 6, wherein said connecting structure further comprises:

at least one annular groove formed in said latch pin channel;

an aperture formed in said outer shaft; and an anchoring member disposed in said aperture and engageable with said at least one annular groove and said inner shaft.

8. A fuel assembly according to claim 7, wherein said anchoring member is a ball.

9. A fuel assembly according to claim 8, wherein said inner shaft comprises a transition shaft portion and an inner shaft head, said inner shaft head comprising a first diameter section, a tapering diameter section and a second diameter section, smaller than said first diameter section, said anchoring member engaging said inner shaft at said tapering diameter section of said inner shaft head.

10. A fuel assembly according to claim 9, wherein said latch pin further comprises a locking ring secured to an inside end of said outer shaft and defining a shelf inside said outer shaft, the latch pin assembly further comprising a spring disposed between said shelf and said first diameter section of said inner shaft head.

* * * * *